(12) United States Patent
Luo et al.

(10) Patent No.: US 11,821,816 B2
(45) Date of Patent: Nov. 21, 2023

(54) TEST DEVICE FOR QUASI ZERO STIFFNESS ISOLATOR

(71) Applicant: NORTHEASTERN UNIVERSITY, Liaoning (CN)

(72) Inventors: Zhong Luo, Liaoning (CN); Yue Qiu, Liaoning (CN); Yunpeng Zhu, Liaoning (CN); Guixin Han, Liaoning (CN); Fei Wang, Liaoning (CN); Qingwen Yu, Liaoning (CN)

(73) Assignee: NORTHEASTERN UNIVERSITY, Liaoning (CN)

( * ) Notice: Subject to any disclaimer, the term of this patent is extended or adjusted under 35 U.S.C. 154(b) by 639 days.

(21) Appl. No.: 17/051,939

(22) PCT Filed: Sep. 4, 2019

(86) PCT No.: PCT/CN2019/104277
§ 371 (c)(1),
(2) Date: Oct. 30, 2020

(87) PCT Pub. No.: WO2020/125067
PCT Pub. Date: Jun. 25, 2020

(65) Prior Publication Data
US 2021/0131911 A1    May 6, 2021

(30) Foreign Application Priority Data
Dec. 21, 2018    (CN) .......................... 201811568015.2

(51) Int. Cl.
*G01M 7/02*        (2006.01)
*F16F 15/00*       (2006.01)
(Continued)

(52) U.S. Cl.
CPC ........... *G01M 7/025* (2013.01); *F16F 15/002* (2013.01); *F16F 15/022* (2013.01);
(Continued)

(58) Field of Classification Search
CPC ...... G01M 7/025; G01M 13/028; G01M 7/02; G01M 13/00; F16F 15/002; F16F 15/022;
(Continued)

(56) References Cited

U.S. PATENT DOCUMENTS

2010/0001445 A1    1/2010    Maruyama et al.

FOREIGN PATENT DOCUMENTS

CN    103453062 A    12/2013
CN    204666087 U    9/2015
(Continued)

OTHER PUBLICATIONS

English translation for CN-108593270-A (Year: 2018).*

*Primary Examiner* — Alesa Allgood
*Assistant Examiner* — Byung Ro Lee
(74) *Attorney, Agent, or Firm* — Muncy, Geissler, Olds & Lowe, P.C.

(57) ABSTRACT

The present invention provides a test device for a quasi zero stiffness isolator, and belongs to the technical field of vibration response tests of isolators. The device comprises a negative stiffness adjusting mechanism, a positive stiffness adjusting mechanism, and a beam-damping block mechanism. The negative stiffness adjusting mechanism and the positive stiffness adjusting mechanism are connected successively and installed on a beam-mass block system. The test device for the quasi zero stiffness isolator can realize smooth longitudinal vibration of a tested system, and can also flexibly adjust the positive stiffness value and the negative stiffness value of an overall mechanism. The present invention is suitable for a vibration model test of the quasi zero stiffness isolator, and solves the problems of complicated use method, impossibility of flexible adjust-
(Continued)

ment of mechanism stiffness and complicated replacement process of stiffness elements in the device for the existing quasi zero stiffness isolator.

4 Claims, 2 Drawing Sheets

(51) Int. Cl.
 *F16F 15/02* (2006.01)
 *F16F 15/04* (2006.01)
(52) U.S. Cl.
 CPC ...... *F16F 15/046* (2013.01); *F16F 2228/063* (2013.01); *F16F 2228/066* (2013.01)
(58) Field of Classification Search
 CPC ............... F16F 15/046; F16F 2228/063; F16F 2228/066; F16F 15/067
 USPC .......................................................... 73/662
 See application file for complete search history.

(56) References Cited

FOREIGN PATENT DOCUMENTS

| | | | | | |
|---|---|---|---|---|---|
| CN | 108302155 A | | 7/2018 | | |
| CN | 108593270 A | * | 9/2018 | ............ | G01M 13/00 |
| CN | 108757799 A | | 11/2018 | | |
| CN | 109540493 A | | 3/2019 | | |

* cited by examiner

TEST DEVICE FOR QUASI ZERO STIFFNESS ISOLATOR

TECHNICAL FIELD

The present invention belongs to the technical field of vibration response tests of isolators, and relates to a test device for a quasi zero stiffness isolator with flexible adjustment of positive and negative stiffness.

BACKGROUND

The cyclic change of a physical state or the phenomenon of reciprocating motion of an object, i.e., vibration phenomenon, generally exists in engineering technology. The vibration of a vehicle makes people feel uncomfortable. The vibration of a precision instrument affects measurement results. The vibration of an earthquake affects the structure of a building. The violent vibration of a bridge and a house may cause sudden collapse during resonance, causing tragedies of death and injury. An isolator can relieve the influence of the problem. Because the problem is a complex nonlinear vibration dynamics problem, it involves impulsive load, resonance, stiffness nonlinearity, damping nonlinearity, material nonlinearity, and transient dynamics. The current theoretical analysis methods cannot solve such problems. Therefore, test research is the most effective solution to such problems. Because of complex working environment and different shapes of foreign objects, the selection of model tests is of important significance.

At present, most of frequently-used vibration isolation tests are combined by several stiffness elements to build a quasi zero stiffness isolator test platform. The defects are that the adjustment of the range of device stiffness is not flexible, the structure of the device is complicated, the device elements are inconvenient to replace, and the loading of stiffness elements is more complicated.

SUMMARY

With respect to the problems in the prior art, the present invention provides a test device for a quasi zero stiffness isolator. The present invention can flexibly adjust a positive stiffness value and a negative stiffness value of a platform, so as to adjust an overall stiffness value of the system, can also stabilize the longitudinal vibration direction of a measured beam to reduce the influence of vibration in other directions on test results, and can also realize the replacement of the stiffness elements at any time. The test device has more comprehensive functions; the adjustment method of the system stiffness value is more convenient; the adjustment accuracy is improved compared with the existing method; and simultaneously, the test period is shortened.

To achieve the above purpose, the present invention adopts the following technical solution:

A test device for a quasi zero stiffness isolator is provided. The test device for the quasi zero stiffness isolator comprises a negative stiffness adjusting mechanism, a positive stiffness adjusting mechanism, and a beam-damping block mechanism.

The negative stiffness adjusting mechanism drives a moving actuator to perform horizontal translation by adjusting a lead screw handwheel, so as to affect the tension and compression state of a spring, thereby adjusting the negative stiffness of the overall device. The negative stiffness adjusting mechanism comprises the lead screw handwheel, a bearing pedestal A, a bottom supporting plate, a lead screw, the moving actuator, a lead screw slider, a bearing pedestal B, the spring, bolts, a nut and a deep groove ball bearing. The bottom supporting plate is connected with the bearing pedestal A and the bearing pedestal B through screws. The bearing pedestal A and the bearing pedestal B are fixed to a frame through the bolts. The lead screw is fixed on the bearing pedestal A and the bearing pedestal B through the deep groove ball bearing, and the front end of the lead screw is fixedly connected with the lead screw handwheel through the screws. The moving actuator is penetrated by the lead screw and is matched with the lead screw through the lead screw slider to ensure that the moving actuator can move left and right on the bottom supporting plate. One end of the spring is fixed on the moving actuator, and the other end is connected with the bolt and fixed by the cooperation between the nut and the bolt.

The positive stiffness adjusting mechanism adjusts the nut to adjust the bending degree of a hollow steel plate to adjust the positive stiffness value of the overall system. The positive stiffness adjusting mechanism comprises the frame, a bottom supporting base, the hollow steel plate, and a nut. The top of the bottom supporting base is connected with the hollow steel plate through the screw, and the bottom is fixed on the frame through the bolt. A supporting rod penetrates through the frame and is matched with the nut. The nut is rotated to move the nut up and down on the supporting rod, thereby squeezing the hollow steel plate and adjusting the bending degree of the hollow steel plate. Thus, the adjustment of the positive stiffness value of the overall system is completed by changing the stiffness of the steel plate.

The beam-damping block mechanism comprises a supporting plate, a supporting seat A, a damping block, a steel plate, a supporting rod, a mass block and a supporting seat. The supporting plate is fixed on the supporting seat B and the bearing pedestal A by screws, and is used to limit the left and right movement of the damping block and the steel plate. The supporting rod is connected with the mass block, the steel plate and the damping block through hole-shaft fit, so that the beam-damping block mechanism is connected with the hollow steel plate. The supporting seat A and the supporting seat B are fixed on the frame by bolts, and are used to limit the movement of the damping block and the steel plate, so as to ensure the stability of the system during vibration.

A stiffness adjusting method of the test device for the quasi zero stiffness isolator comprises the following steps:

Step I: adjusting a negative stiffness value of an overall system;

controlling the rotation of the lead screw handwheel to realize the movement of the lead screw slider, thereby driving the moving actuator to move on the bottom supporting plate; fixing one end of the spring to the bolt; fixing the other end to the moving actuator; and driving the spring to compress or stretch by the left and right movement of the moving actuator, thereby adjusting the negative stiffness value of the overall system.

Step II: adjusting a positive stiffness value of the overall system;

rotating the nut to squeeze the hollow steel plate, and adjusting the bending degree of the hollow steel plate by adjusting the position of the nut on the supporting rod, thereby completing the adjustment of the positive stiffness value of the overall system through the stiffness change of the steel plate and ensuring operation stability and accuracy of the positive stiffness adjusting mechanism through the cooperation of the bottom supporting base and the hollow steel plate.

Step III: limiting the transverse displacement of the beam-damping block mechanism during vibration;

limiting the transverse displacement of the beam-damping block mechanism during vibration through the fixed connection of the supporting plate with the supporting seat B and the bearing pedestal A, so that the beam-damping block mechanism can perform longitudinal vibration when the mechanism is vibrated.

Step IV: designing quasi zero stiffness of the overall mechanism making the stiffness of the overall mechanism achieve a state close to zero through adjustment and combination by means of longitudinal stiffness $k_1$ of steel plates and transverse stiffness $k_2$ of the spring, wherein the mass of the mass block is in; a force applied to the overall mechanism is F(t); the displacement of the transverse spring is $x_0$; half of the length of the beam is L; and a vibration response formula of the overall mechanism is $$m\ddot{y} + c\dot{y} + \left(k_1 - 2\frac{k_2}{L}x_0\right)y = F(t).$$

The test device for a variable stiffness isolator in the present invention adds negative stiffness elements, adopts a new design solution, and solves the problems of large volume, complicated operation, impossibility of flexible stiffness adjustment and difficulty in replacing the stiffness elements in the existing device. The transverse spring is used as the negative stiffness element of the overall system; the size of the stiffness of the negative stiffness element of the transverse spring is controlled by controlling the displacement of the lead screw slider by the handwheel; the bending of the steel plate is controlled through the tightening of the bolts to control the size of the stiffness of the positive stiffness element in a vertical direction, thereby achieving the adjustment of the overall stiffness of the system; and the moving actuator can be moved during an initial installation stage to realize flexible installation and unloading of the negative stiffness element of the transverse spring.

In the figures: 1 negative stiffness adjusting mechanism; 2 positive stiffness adjusting mechanism; 3 beam-damping block mechanism;

101 handwheel; 102A bearing pedestal; 103 bottom supporting plate; 104 lead screw; 105 moving actuator; 106 lead screw slider; 107B bearing pedestal; 108 spring; 109 bolt; 110 nut; 111 deep groove ball bearing; 201 frame; 202 bottom supporting base; 203 hollow steel plate; 204 nut;

301 supporting plate; 302A supporting seat; 303 damping; 304 steel plate; 305 supporting rod; 306 mass block; 307B supporting seat;

401 force applied to overall mechanism; 402 mass of mass block; 403 longitudinal stiffness of steel plates; 404 half of length of beam; 405 stiffness of transverse spring; and 406 displacement of transverse spring.

DETAILED DESCRIPTION

Specific embodiments of the present invention are further described below in combination with accompanying drawings and the technical solution.

Figure 1:
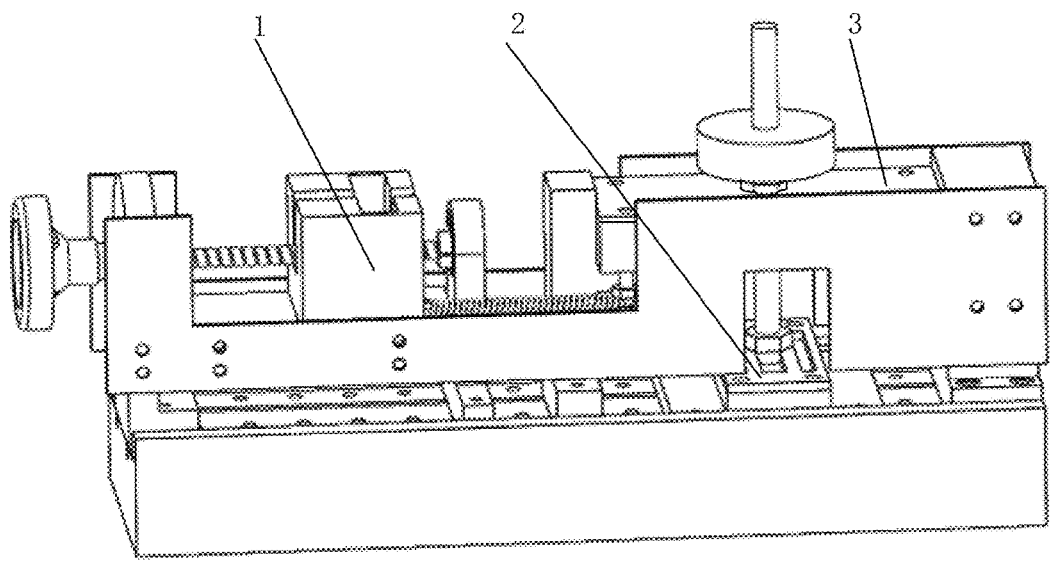
FIG. 1 is an overall structural schematic diagram of a test device for a quasi zero stiffness isolator in the present invention.

As shown in FIG. 1, an overall structure of a test device for a quasi zero stiffness isolator of the present invention comprises a negative stiffness adjusting mechanism 1, a positive stiffness adjusting mechanism 2, and a beam-damping block mechanism 3.

Figure 2:
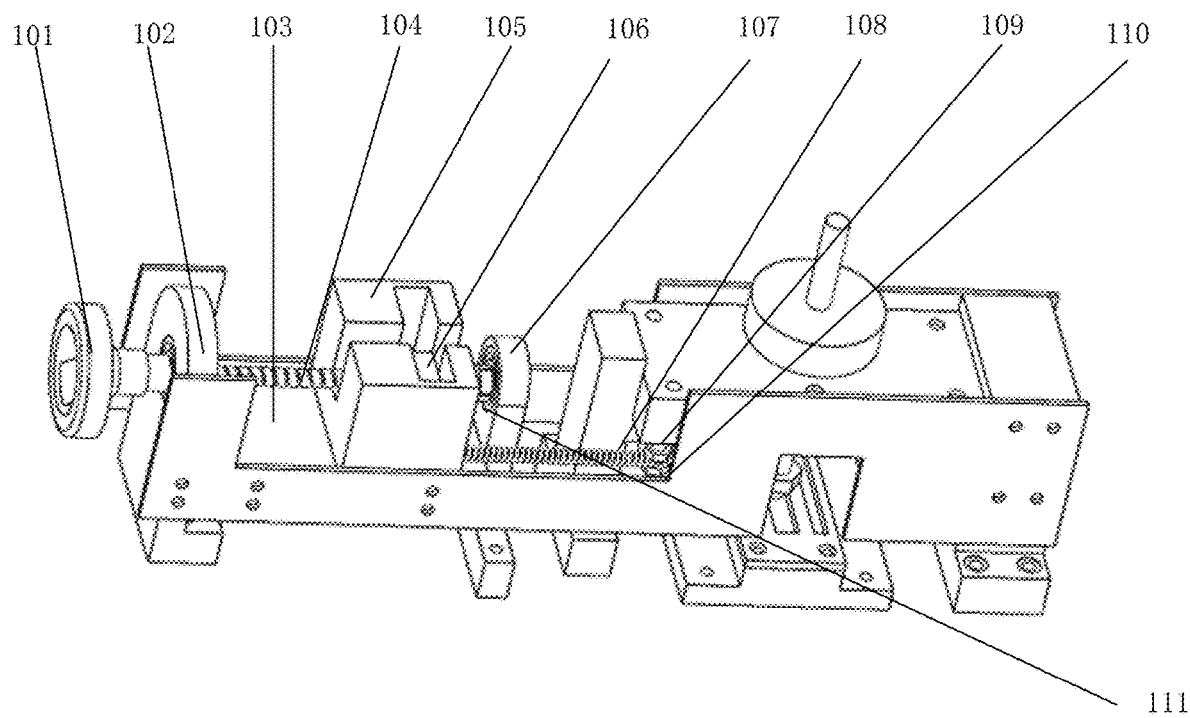
FIG. 2 is a schematic diagram of a negative stiffness adjusting mechanism of a test device for a quasi zero stiffness isolator in the present invention.

As shown in FIG. 2, the negative stiffness adjusting mechanism 1 is used to adjust the negative stiffness value of the system. The negative stiffness adjusting mechanism comprises a lead screw handwheel 101, a bearing pedestal A102, a bottom supporting plate 103, a lead screw 104, a moving actuator 105, a lead screw slider 106, a bearing pedestal B107, a spring 108, bolts 109, a nut 110 and a deep groove ball bearing 111. The bottom supporting plate 103 is connected with the bearing pedestal A102 and the bearing pedestal B107 through screws. The bearing pedestal A and the bearing pedestal B are fixed to a frame 201 through the bolts. The lead screw 104 is fixed on the bearing pedestal A and the bearing pedestal B through the deep groove ball bearing 111, and the front end of the lead screw is fixedly connected with the lead screw handwheel 101 through the screws. The moving actuator 105 is penetrated by the lead screw 104 and is matched with the lead screw through the lead screw slider 106 to ensure that the moving actuator 105 can move left and right on the bottom supporting plate. One end of the spring 108 is fixed on the moving actuator, and the other end is connected with the bolt 109 and fixed by the cooperation between the nut 110 and the bolt.

Figure 3:
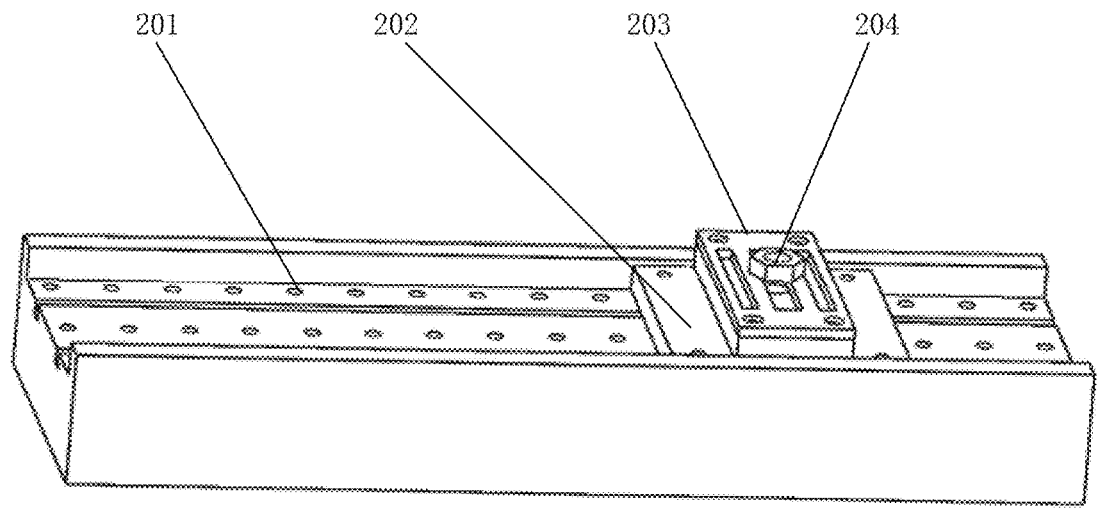
FIG. 3 is a schematic diagram of a positive stiffness adjusting mechanism of a test device for a quasi zero stiffness isolator in the present invention.

As shown in FIG. 3, the positive stiffness adjusting mechanism 2 comprises the frame 201, a bottom supporting base 202, a hollow steel plate 203 and a nut 204. The top of the bottom supporting base 202 is connected with the hollow steel plate 203 through the screw, and the bottom is fixed on the frame 201 through the bolt. A supporting rod 305 penetrates through the frame 201 and is matched with the nut 204. The nut is rotated to move the nut up and down on the supporting rod, thereby squeezing the hollow steel plate 203 and adjusting the bending degree of the hollow steel plate 203. Thus, the adjustment of the positive stiffness value of the overall system is completed by changing the stiffness of the steel plate.

Figure 4:
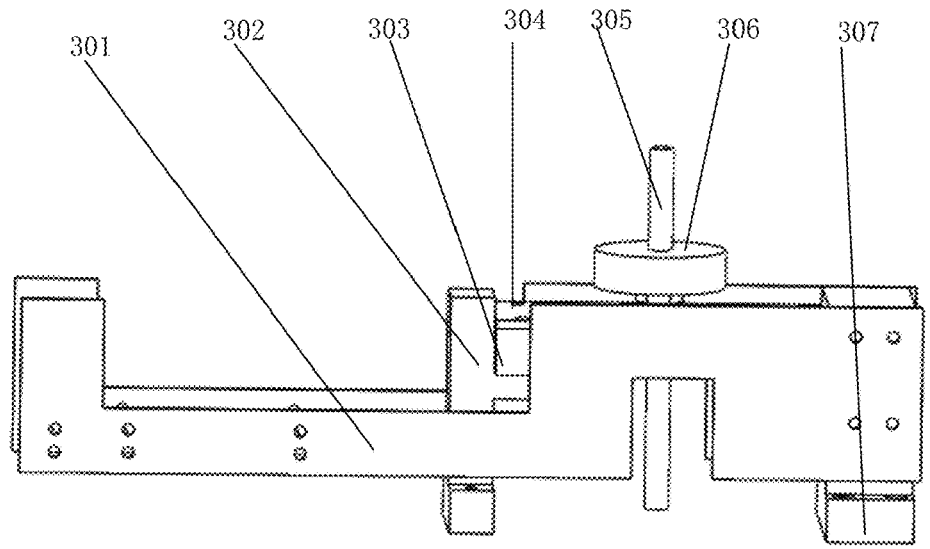
FIG. 4 is a structural schematic diagram of a beam-damping block mechanism of a test device for a quasi zero stiffness isolator in the present invention.
Figure 5:
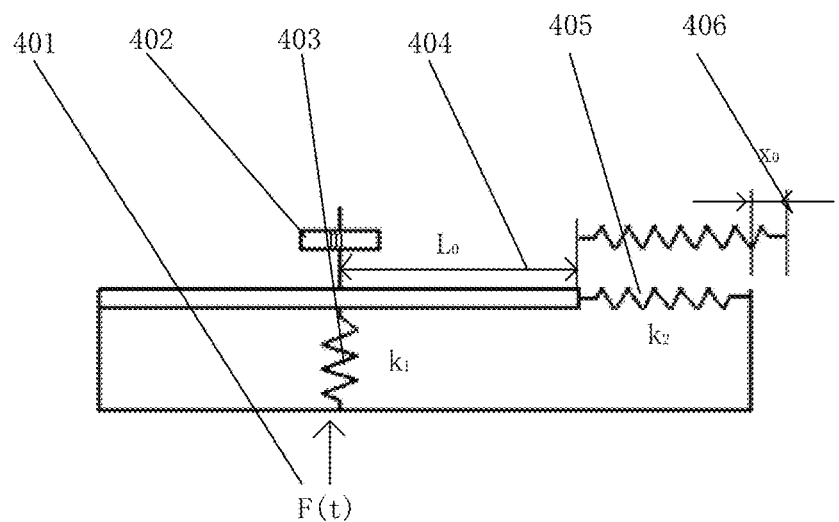
FIG. 5 is a schematic diagram of a test device for a quasi zero stiffness isolator in the present invention.

As shown in FIG. 4, the beam-damping block mechanism comprises a supporting seat A302, a damping block 303, a steel plate 304, a supporting rod 305, a mass block 306 and a supporting seat B307. The supporting plate 301 is fixed on the supporting seat B307 and the bearing pedestal A102 by screws, and is used to limit the left and right movement of the damping block 303 and the steel plate 304. The supporting rod 305 is connected with the mass block 306, the steel plate 304 and the damping block 303 through hole-shaft fit, so that the beam-damping block mechanism 3 is connected with the hollow steel plate 203. The supporting seat A302 and the supporting seat B307 are fixed on the frame 201 by bolts, and are used to limit the movement of the damping block 303 and the steel plate 304, so as to ensure the stability of the system during vibration.

A stiffness adjusting method of the test device for the quasi zero stiffness isolator comprises the following steps:

Step I: adjusting a negative stiffness value of an overall mechanism; controlling the rotation of the lead screw handwheel 101 to realize the movement of the lead screw slider 106, thereby driving the moving actuator 105 to move on the bottom supporting plate 102; fixing one end of the spring 108 to the bolt 109; fixing the other end to the moving actuator 105; and driving the spring 108 to compress or stretch by the left and right movement of the moving actuator 105, thereby adjusting the negative stiffness value of the overall system.

Step II: adjusting a positive stiffness value of the overall mechanism; rotating the nut 204 to squeeze the hollow steel plate 203, and adjusting the bending degree of the hollow steel plate 203 by adjusting the position of the nut 204, thereby completing the adjustment of the positive stiffness value of the overall system through the stiffness change of the steel plate and ensuring operation stability and accuracy of the positive stiffness adjusting mechanism through the cooperation of the bottom supporting base 202 and the hollow steel plate 203.

Step III: limiting the transverse displacement of the beam-damping block mechanism during vibration; limiting the transverse displacement of the beam-damping block mechanism during vibration through the fixed connection of the supporting plate 301 with the supporting seat B307 and the bearing pedestal A102, so that the beam-damping block mechanism can perform longitudinal vibration when the mechanism is vibrated.

Step IV: designing quasi zero stiffness of the overall mechanism making the stiffness of the overall mechanism achieve a state close to zero through adjustment and combination by means of longitudinal stiffness $k_1$ 403 of steel plates and transverse stiffness $k_2$ 405 of the spring, wherein the mass of the mass block 306 is m402; a force applied to the overall mechanism is F(t)401; the displacement of the transverse spring is $x_0$ 406; half of the length of the beam is L404; and a vibration response formula of the overall mechanism can be expressed as:

$$m\ddot{y} + c\dot{y} + \left(k_1 - 2\frac{k_2}{L}x_0\right)y = F(t).$$

The invention claimed is:

1. A test device for a quasi zero stiffness isolator, comprising a negative stiffness adjusting mechanism, a positive stiffness adjusting mechanism, and a beam-damping block mechanism, wherein the negative stiffness adjusting mechanism drives a moving actuator to perform horizontal translation by adjusting a lead screw handwheel, so as to affect the tension and compression state of a spring, thereby adjusting the negative stiffness of the overall device; the negative stiffness adjusting mechanism comprises a lead screw handwheel, a bearing pedestal, a bottom supporting plate, a lead screw, the moving actuator, a lead screw slider, a bearing pedestal B, the spring, bolts, a nut and a deep groove ball bearing; the bottom supporting plate is connected with the bearing pedestal and the bearing pedestal through screws; the bearing pedestal and the bearing pedestal are fixed to a frame through the bolts; the lead screw is fixed on the bearing pedestal and the bearing pedestal through the deep groove ball bearing, and the front end of the lead screw is fixedly connected with the lead screw handwheel through the screws; the moving actuator is penetrated by the lead screw and is matched with the lead screw through the lead screw slider to ensure that the moving actuator can move left and right on the bottom supporting plate; one end of the spring is fixed on the moving actuator, and the other end is connected with the bolt and fixed by the cooperation between the nut and the bolt;

the positive stiffness adjusting mechanism adjusts a nut to adjust the bending degree of a hollow steel plate to adjust the positive stiffness value of the overall system; the positive stiffness adjusting mechanism comprises the frame, a bottom supporting base, the hollow steel plate and the nut; the top of the bottom supporting base is connected with the hollow steel plate through the screw, and the bottom is fixed on the frame through the bolt; a supporting rod penetrates through the frame and is matched with the nut; the nut is rotated to move the nut up and down on the supporting rod, thereby squeezing the hollow steel plate and adjusting the bending degree of the hollow steel plate; thus, the adjustment of the positive stiffness value of the overall system is completed by changing the stiffness of the steel plate;

the beam-damping block mechanism comprises a supporting plate, a supporting seat, a damping block, a steel plate, the supporting rod, a mass block and a supporting seat; the supporting plate is fixed on the supporting seat and the bearing pedestal by screws, and is used to limit the left and right movement of the damping block and the steel plate; the supporting rod is connected with the mass block, the steel plate and the damping block through hole-shaft fit, so that the beam-damping block mechanism is connected with the hollow steel plate; the supporting seat and the supporting seat are fixed on the frame by bolts, and are used to limit the movement of the damping block and the steel plate, so as to ensure the stability of the system during vibration.

2. The test device for the quasi zero stiffness isolator according to claim 1, wherein for limiting of the transverse displacement of the beam-damping block mechanism during vibration, the transverse displacement of the beam-damping block mechanism is limited during vibration through the fixed connection of the supporting plate with the supporting seat and the bearing pedestal, so that the beam-damping block mechanism can perform longitudinal vibration when the mechanism is vibrated.

3. The test device for the quasi zero stiffness isolator according to claim 1, wherein the replacement of the spring and the hollow steel plate as the stiffness elements of the mechanism is relatively convenient; the screw for fixing the hollow steel plate on the bottom supporting base is removed, that is, the hollow steel plate is replaced; the position of the moving actuator is adjusted left and right, so that the spring is in a relaxed state; and the spring is removed and replaced.

4. A stiffness adjusting method of the test device for the quasi zero stiffness isolator according to claim 1, comprising the following steps:

step I: adjusting a negative stiffness value of an overall mechanism;

controlling the rotation of the lead screw handwheel to realize the movement of the lead screw slider, thereby driving the moving actuator to move on the bottom supporting plate; fixing one end of the spring to the bolt; fixing the other end to the moving actuator; and driving the spring to compress or stretch by the left and right movement of the moving actuator, thereby adjusting the negative stiffness value of the overall system;

step II: adjusting a positive stiffness value of the overall mechanism;

rotating the nut to squeeze the hollow steel plate, and adjusting the bending degree of the hollow steel plate by adjusting the position of the nut, thereby completing the adjustment of the positive stiffness value of the overall system through the stiffness change of the steel plate and ensuring operation stability and accuracy of the positive stiffness adjusting mechanism through the cooperation of the bottom supporting base and the hollow steel plate;

step III: limiting the transverse displacement of the beam-damping block mechanism during vibration;

limiting the transverse displacement of the beam-damping block mechanism during vibration through the fixed connection of the supporting plate with the supporting seat and the bearing pedestal, so that the beam-damping block mechanism can perform up-down longitudinal vibration when the mechanism is vibrated;

step IV: designing quasi zero stiffness of the overall mechanism making the stiffness of the overall mechanism achieve a state close to zero through adjustment and combination by means of longitudinal stiffness $k_1$ of steel plates and transverse stiffness $k_2$ of the spring, wherein the mass of the mass block is m;

a force applied to the overall mechanism is F(t); the displacement of the transverse spring is $x_0$; half of the length of the beam is L; and a vibration response formula of the overall mechanism is expressed as:

$$m\ddot{y} + c\dot{y} + \left(k_1 - 2\frac{k_2}{L}x_0\right)y = F(t).$$

* * * * *